United States Patent Office 3,528,279
Patented Sept. 15, 1970

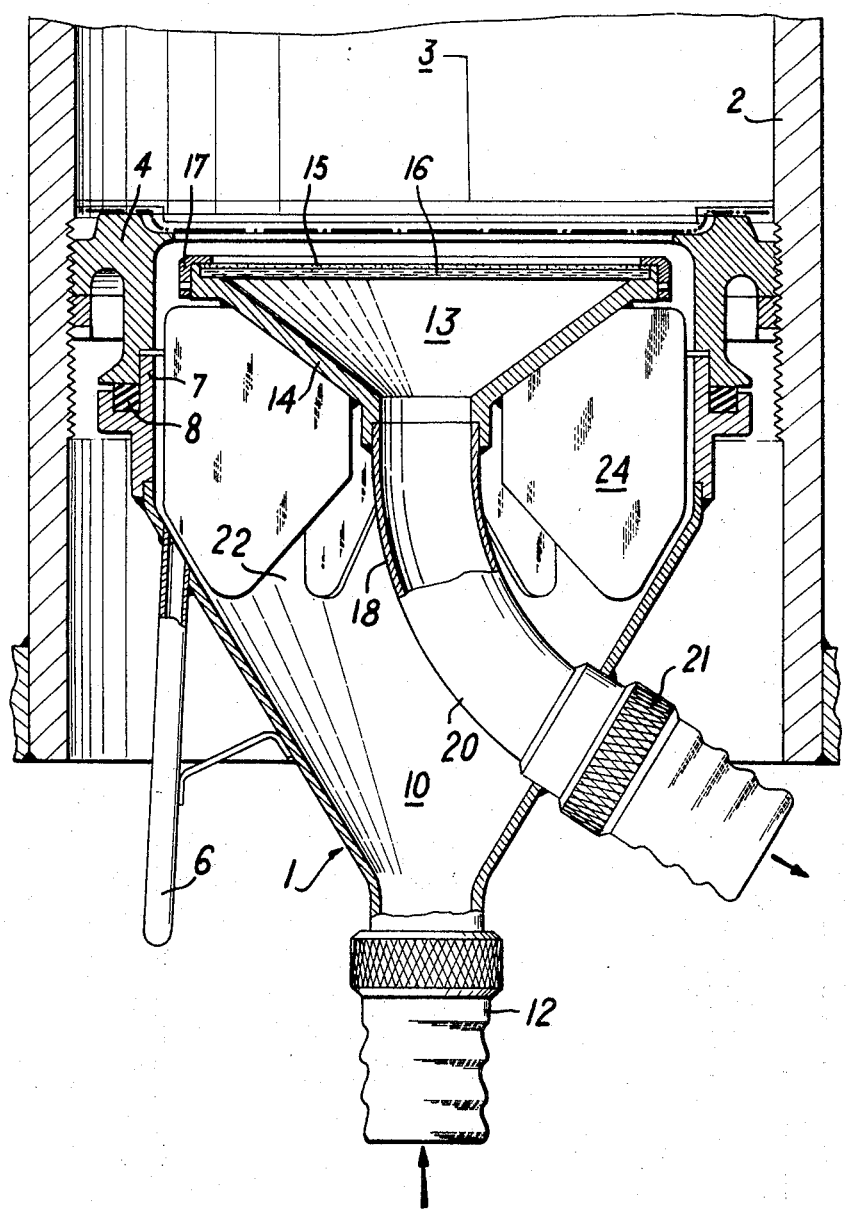

3,528,279
DEVICE FOR SAMPLING AEROSOLS
Claude Lasseur, Clamart, Claude Tonnelier, Verneuil-sur-Seine, and Jean Claude Zerbib, Antony, France, assignors to Commissariat a l'Energie Atomique, Paris, France
Filed Jan. 22, 1968, Ser. No. 699,453
Claims priority, application France, Jan. 31, 1967, 93,277
Int. Cl. B01d *29/04;* G01n *1/24*
U.S. Cl. 73—28        6 Claims

ABSTRACT OF THE DISCLOSURE

A device for sampling aerosols contained in a fluid, comprising means for circulating said fluid through a filter for retaining aerosols. Said filter separates a sampling chamber from a chamber for the discharge of said fluid, said discharge chamber being disposed within said sampling chamber and so arranged as to define therewith an annular space through which the fluid is circulated upstream of the filter. Radial fins for distributing said fluid are provided in said annular space.

---

This invention relates to a device for sampling aerosols which is primarily intended for the detection and measurement of the concentration of radioactive aerosols in the atmosphere.

The invention is more especially concerned with a device for sampling aerosols contained in a fluid of the type comprising means for circulating said fluid through a filter which serves to retain the aerosols and provides a separation between a sampling chamber and a chamber for discharging said fluid.

The essential object of the invention is to obtain on the filter a homogeneous deposit which is representative of the aerosols contained in the fluid while permitting analysis of the deposit during the sampling operation.

It is already known to make use of sampling devices for the main purpose of analyzing radioactive aerosols contained in the atmosphere, in which a radiation detector is placed against the filter for the purpose of providing a continuous measurement of the intensity of radiation emitted by the aerosols retained on the filter. In devices of this type, the detector is located inside the sampling chamber; it must be placed as near as possible to the filter and cover the entire surface of this latter. Consequently, the pipe through which the fluid is admitted into the sampling chamber must be placed laterally with respect to the filter.

These known devices thus have a disadvantage in that they provide dead zones for the circulation of the fluid in which a proportion of the aerosols is consequently deposited before these latter reach the filter. In addition, the deposits which are formed on the filter are not homogeneous and this absence of homogeneity has unfavorable consequences, particularly in regard to the accuracy of radiation measurements which indicate the concentration of radioactive aerosols. In fact, the detection probes (such as a scintillation counter, for example) are usually calibrated for a homogeneous deposit. In addition, such probes are more sensitive to the radiations emanating from the center of the filter than to the radiations which emanate from the periphery.

One of the aims of the present invention is therefore to ensure homogeneity of the aerosol deposit on the filter in order to derive the maximum benefit from the higher efficiency of the detection means in the central zone and also in order to make it possible after removal of the filter from the device to take subsequent laboratory measurements by means of calibrated probes.

A further aim of this invention is to reduce as far as possible the abrupt loss of fluid velocity in the sampling device and to prevent any part of the aerosols from being deposited by impact within the sampling chamber before reaching the filter, and thus affecting the measurements. It has therefore been sought to avoid as far as possible the presence of any dead zones in which the aerosol deposits are liable to form upstream of the filter and to restore the velocity of any particle which has sustained a first impact against the walls of the sampling chamber.

The device for sampling aerosols in accordance with the invention makes it possible to satisfy the essential conditions set forth above more effectively than any of the comparable devices of the prior art.

The device is essentially characterized in that the discharge chamber is disposed inside the sampling chamber and defines with this latter an annular space through which the fluid is circulated upstream of the filter and in which are disposed radial fins for the distribution of said fluid.

According to a preferred embodiment of the invention, the sampling chamber has a progressively increasing cross-section from a fluid-inlet pipe up to said fins, and the discharge chamber is defined by a cone, the base of which is occupied by a filter and the apex of which opens into a discharge pipe which passes through the side wall of the sampling chamber.

The whole device is advantageously endowed with symmetry of revolution.

In the device according to the invention, the presence of fins in the annular space which is defined by the chambers for sampling and discharge of fluid ensures a radial distribution of the fluid: each fluid stream is oriented towards the center of the filter and parallel to this latter, the space available between the filter and the wall of the sampling chamber being preferably small. In consequence, a not negligible fraction of the fluid flow reaches the center of the filter and each portion of said filter, whether said portion is located in the central zone or on the contrary in the peripheral zone, is traversed by a part of the fluid and retains the aerosols contained therein. The deposit obtained is thus uniformly distributed over the entire surface of the filter.

It has also been found that the quality of the deposit obtained and the reproducibility of measurements were closely related to the flow regime of the fluid under analysis within the device whereas, up to the present time, the influence of the flow conditions had been wholly unappreciated.

According to a secondary feature of the invention, the device is so dimensioned that the state of flow of the fluid is laminar at the level of the fins and of the filter, this being naturally the case in respect of a predetermined range of flow rates. On the other hand, the fluid advantageously flows in a turbulent state within the pipe through which it is admitted into the sampling device in order to prevent the deposition of any part of the aerosols upstream of the device.

Within the sampling chamber, the change from turbulent flow to laminar flow preferably takes place immediately upstream of the radial fins. Inasmuch as said fins tend to reduce the Reynolds number, a free laminar flow regime is thus established at the level of the filter. Furthermore, the instability zone corresponding to the change of flow regime is accordingly reduced.

Said laminar flow combined with the particular shape which is given to the sampling chamber has the effect of carrying up to the filter itself all the particles contained in the fluid which penetrates into the chamber. This effectively circumvents one essential defect of prior art devices in which aerosol deposits upstream of the filter impaired the validity of the sampling and additionally gave rise to contamination of the sampling chamber.

Referring to the single figure of the accompanying drawings, there will now be described one particular embodiment of the sampling device in accordance with the invention as chosen by way of example and not in any sense by way of limitation.

In the sampling device which is shown diagrammatically in the figure, the body 1 is removably fixed inside a cylindrical support tube 2. Said tube performs the function of a support, not only for the removable sampling head, but also for a scintillation counting unit 3 for measuring the radiation emitted by the aerosol deposit as well as for lead rings which are disposed around the tube 2 for the purpose of shielding the unit from stray radiations. Said rings are not shown in the figure. The counting unit 3 for measuring the radiation is shown diagrammatically in the figure.

A mounting ring 4 is screwed into the support tube 2. The counting unit 3 is intended to be fitted over said ring whilst the sampling head is suspended from the lower end thereof. The dot-dash line on the upper surfaces of element 4 schematically illustrates the limit of the counting unit which allows for the examination of the radiation that is emitted by the deposit of the aerosol.

To this end, the body 1 which is manipulated by means of a handle 6 has an extension in the form of a sealing collar 7 which is fixed on the ring 4 by means of a bayonet system. A seal 8 ensures imperviousness to gases and to light.

The body 1 defines with the collar 7, the ring 4 and the counting unit a leak-tight sampling chamber 10. The fluid to be analyzed, which is usually a gas and more especially atmospheric air, is admitted axially into said sampling chamber via an inlet pipe 12 which is fitted with a quick union and can thus be rapidly connected to the body 1. Said body has a conical shape and accordingly widens from the inlet pipe 12 to the sealing collar 7.

Inside the chamber 10, there is located a discharge chamber 13 which is defined by a suction cone 14, the large base of which is closed by a filter 15. Said filter consists of ordinary filter paper and is supported by a metallic grid 16. The assembly of grid and filter is maintained by means of a locking ring 17.

The large base of the suction cone 15 as shown in the figure is upwardly oriented in the same manner as the body 1. The distance between said large base and the top end of the chamber 10 is small, and essentially dependent upon the conditions governing the detection of aerosols deposited on the filter 15 by means of the counting unit 3. At the lower end thereof, the suction cone 14 is connected to a pipe 18 for the discharge of fluid which forms an elbow 20 and passes out of the chamber 10 through the side wall of the body 1. Said pipe is fitted with a quick union 21 whereby the device can be connected to an apparatus which serves to suck the fluid from the sampling chamber through the filter 15.

The suction cone 14 defines with the walls of the chamber 10 (essentially formed by the body 1 which terminates in the collar 7) an annular space 22 through which the fluid must pass before reaching the filter 15. Provision is made within said annular space for fins 24 which are welded to the outer surface of the cone 14. Said fins are oriented radially with respect to the cone. The number of fins is chosen as a function of the operating conditions envisaged in order to ensure that a free laminar flow is obtained upstream of the filter.

The complete assembly of sampling chamber, discharge chamber and fins possesses symmetry of revolution.

The device as a whole is dimensioned as a function of the nature of the fluid and the rate of sampling which is contemplated in order to ensure that the flow, which is in the turbulent state within the pipe 12, should become substantially laminar at the level of the lower ends of the fins 24. The fins subsequently ensure a homogeneous distribution of the streamlines of fluid and "tranquilize" the streams of fluid by reducing the Reynolds number and preventing the inception of a helical flow motion around the suction cone 14.

It is additionally apparent that the shape of the device is such that there does not exist any dead zone in which a deposit of aerosol particles is liable to form and that those particles which have impinged on the walls of the chamber 10 and essentially on the elbow of the outlet pipe are automatically restored to their initial velocity. This restoration of velocity is ensured irrespective of the position of the device in space.

The device hereinabove described is also designed so that it can be readily disassembled. A rotation of the body 1 through a few degress releases the sampling head. The filter itself is removed after unlocking the ring 17. This ease of disassembly permits the possibility of checking any contamination which may be present and of changing the filter. During normal operation, the quantity of aerosols deposited is continuously measured by the scintillation counting unit. The rapid withdrawal of the movable portion from the support tube makes it possible to replace said portion in order to perform a routine test without interrupting the measurements.

There now follows an example of construction which serves to explain the method of dimensioning of the above-described device by applying known correlations between the characteristics of geometry and the parameters of fluid flow.

It is known that the conditions of flow of a fluid are essentially governed by the value of the Reynolds number. This number is expressed as a function of the flow velocity V, the hydraulic diameter D, the specific density $\rho$ and dynamic viscosity $\mu$ of the fluid by the following relation:

$$\mathrm{Re}=\frac{\rho V D}{\mu}$$

The hydraulic diameter is in turn expressed as a function of the flow cross-sectional area S and the perimeter P which is wetted by the fluid:

$$D=\frac{4S}{P}$$

In the present example, the fluid being analyzed is air under normal conditions of temperature and pressure.

We therefore have:

$\rho=1.205\times10^{-3}$ g./cm.$^3$ and $\mu=18\times10^{-5}$ g./cm.s.

So far as the sampling rate is concerned, the rate of human respiration is usually taken into consideration, namely approximately 1.2 m.$^3$/h. on continuous rating, or 2.4 m.$^3$/h. on a pulsed rating (time of inhalation equal to the exhalation time). However this value of flow rate is too low to provide with good statistical accuracy a population of aerosols which is representative of the sampling location both from a qualitative and quantitative standpoint. Thus, in the case of some radioactive aerosols, a single particle per cubic meter of air can represent a high level of activity and a concentration which is in excess of the maximum permissible concentration. In order to ensure a good probability of collection of aerosols, there has accordingly been chosen in this example a flow rate which is seven times higher than the "standard" human breathing rate, namely Q=8.5 m.$^3$/h.

The diameter of the filter is selected as a function of the requisite flow rate, of the dimensions and of the concentration of the aerosol particles encountered. A diameter which is too small would in fact result in rapid clogging of the filter and a modification of the characteristics of the air flow. Furthermore, the filter must be sufficiently close to the detector of the counting unit to prevent any substantial absorption of radiations in the intermediate layer of air.

In the particular case herein described, use is made of a filter paper which has a high stopping power and a diameter of 110 mm. and which is placed at a distance of 3 mm. from the detector. A smaller distance would not introduce any appreciable modification in the count rate but would, on the other hand, increase the pressure losses.

The inlet pipe for the admission of air into the sampling chamber has an internal diameter of 30 mm. In the case of the air flow rate Q under consideration, the flow velocity is $V=333$ cm./sec. A calculation of the corresponding Reynolds number gives: $Re=6700$. In the case of the conventional pipes employed, this value corresponds to a turbulent air flow.

Within the annular space around the suction cone, the Reynolds number is calculated as a function of the internal diameter D of the chamber and of the external diameter $d$ of the cone at the level of its lower base (air outlet pipe) and of the number $n$ of fins. We find:

$$Re = \frac{4\rho Q}{\mu P} = \frac{4\rho Q}{\mu[\pi(D+d)+n(D-d)]}$$

In the example herein described, we have selected: $D=12.8$ cms.; $d=3.8$ cms.; $n=6$ fins.

For the same air flow Q, we therefore find:

$Re=600$.

This value corresponds to a free laminar flow regime.

Similarly, at the level of the filter, in the case of a diameter of 12 cms. and a height of 2 mm. (taking into account the locking ring of the filter) we find $Re=840$. The flow is again in a free laminar state.

The values obtained in respect of the Reynolds number show that the flow can be increased from 8.5 m.³/h. to a rate of 15 or 20 m.³/h. while remaining in the laminar state.

What we claim is:

1. A device for sampling aerosols contained in a pipe, comprising means for circulating said fluid through an aerosol filter, a conduit for sampling said fluid upstream of the filter and comprising a first portion having a conical cross-section whose apex opens into a pipe for the admission of said fluid and a second portion having a cylindrical cross-section which forms an extension of said first portion and contains said filter, a fluid discharge chamber disposed within said second portion of the sampling conduit and having the shape of a cone whose base is occupied by the filter and whose apex opens into a discharge pipe which transverses the side wall of said first conical portion of the sampling conduit, and radial fins disposed within the annular space which is defined by said discharge chamber and said second cylindrical portion of the sampling conduit, said fins being intended to ensure upstream of the filter a homogeneous distribution of the fluid and a laminar flow.

2. An apparatus for sampling aerosols contained in a fluid which comprises a sampling conduit provided with a fluid-inlet pipe, said sampling conduit having a progressively increasing cross-sectional area extending from said fluid-inlet pipe, a cone-shaped discharge disposed in said sampling conduit, the base of said discharge chamber being provided with a filter means which separates the sampling conduit from the discharge chamber and the apex of said discharge chamber containing a discharge pipe which passes through the side wall of the sampling conduit, the walls of the sampling conduit and the walls of the discharge chamber defining an annular space therebetween through which the fluid is introduced from the fluid-inlet pipe, and fin means radially disposed in said annular space to provide laminar flow upstream of the filter means.

3. The apparatus of claim 2, wherein means is provided for detecting radiations emitted by the aerosol retained on the filter means, said means being disposed externally of the sampling conduit and in close promixity to the filter means.

4. The apparatus of claim 2, wherein the fin means are attached to the wall of the discharge chamber.

5. The apparatus of claim 4, wherein the cross-section of the sampling conduit increases from the fluid-inlet pipe up to the fin means.

6. The apparatus of claim 2, mounted in a cylindrical support tube.

References Cited

UNITED STATES PATENTS 2,790,253  4/1957  Ayer _____ 73—28 X
3,011,336  12/1961  Weiss _____ 73—29

FOREIGN PATENTS 828,317  1/1952  Germany.

RICHARD C. QUEISSER, Primary Examiner

C. E. SNEE III, Assistant Examiner

U.S. Cl. X.R.

55—270